Aug. 29, 1950       G. S. HAMILTON       2,520,680
CORN PLANTER
Filed Sept. 20, 1946       2 Sheets-Sheet 1
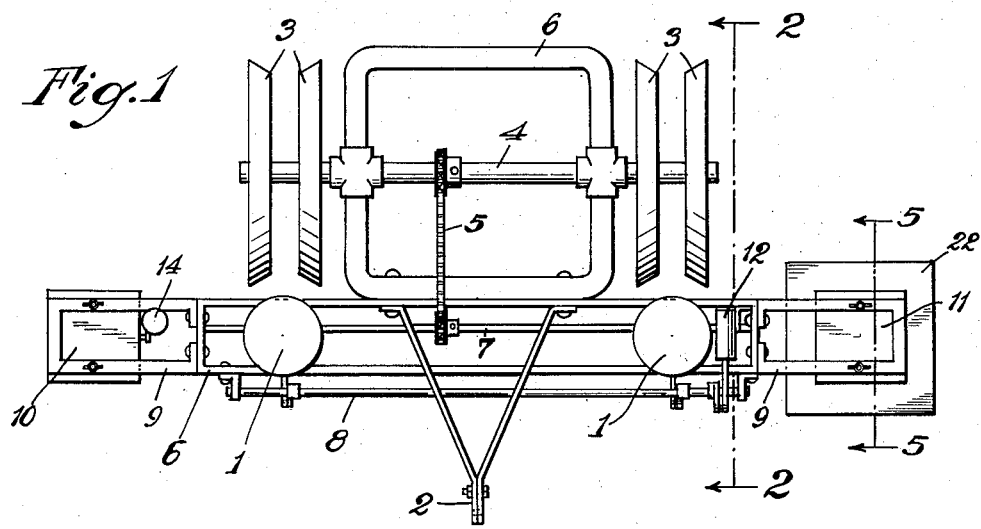
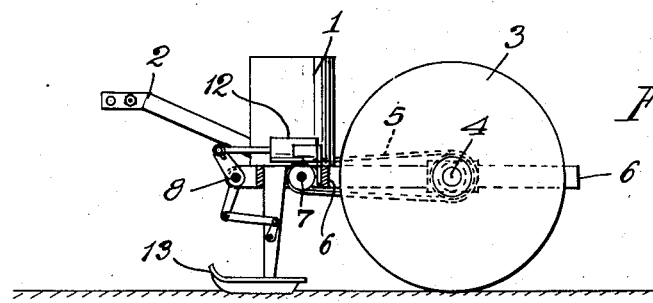
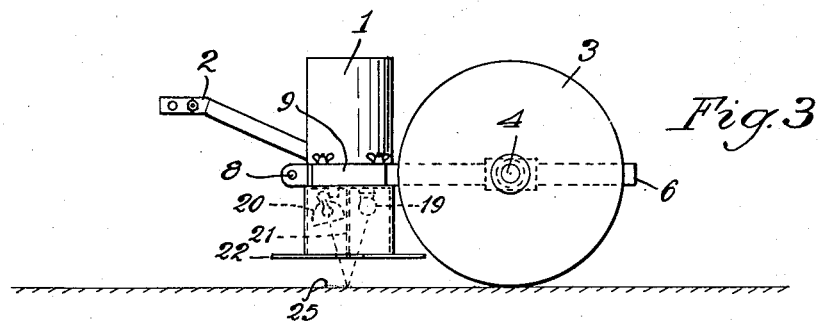
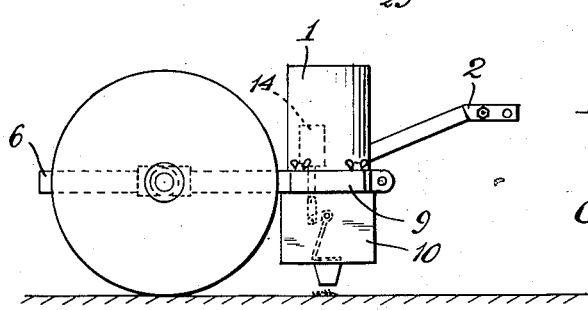
Inventor
George S. Hamilton
by Parker & Carter
Attorneys Aug. 29, 1950     G. S. HAMILTON     2,520,680
CORN PLANTER
Filed Sept. 20, 1946     2 Sheets—Sheet 2
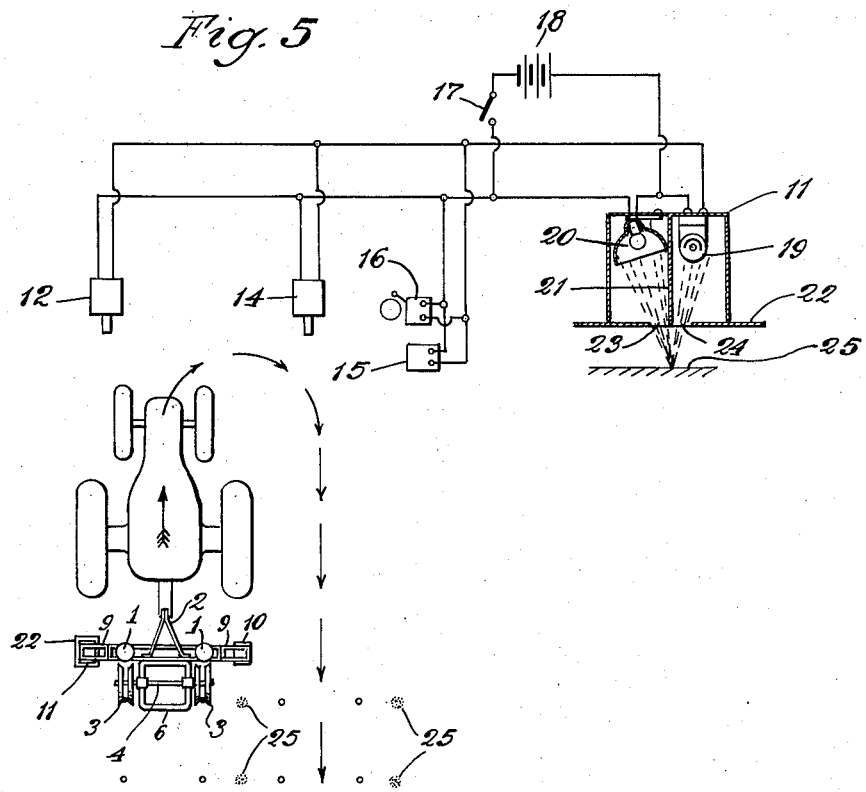
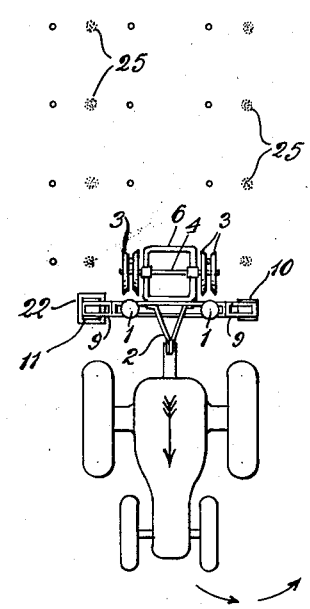
Inventor
George S. Hamilton
by Asher & Carter
Attorneys Patented Aug. 29, 1950

2,520,680

UNITED STATES PATENT OFFICE 2,520,680

CORN PLANTER

George S. Hamilton, Bartlett, Ill.

Application September 20, 1946, Serial No. 698,298

3 Claims. (Cl. 111—25)

My invention relates to improvements in corn planters and the like, and has for one object to provide a seed or corn planter which will plant seeds or other articles in predetermined locations or spots in rows evenly spaced without the use of a check wire or any similar mechanism.

Another object of my invention is to provide a seed planter which on each trip across the field will set the pattern for each successive trip without the use of wires or similar mechanism and wherein the pattern will be entirely dependent on linear distances traveled and independent of wheel slippage and the like.

Another object of my invention is to use a photo-electric cell to control the point at which seeds are dropped.

Other objects will appear from time to time throughout the specification and claims.

My invention is illustrated more or less diagrammatically in the accompanying drawings, wherein Figure 1 is a skeleton plan view of a corn planter embodying my invention;

Figure 2 is a section along the line 2—2 of Figure 1 with parts omitted;

Figure 3 is a side elevation of Figure 1 viewed from the right hand side;

Figure 4 is a side elevation of Figure 1 viewed from the left hand side;

Figure 5 is a wiring diagram with parts in section along the line 5—5 of Figure 1; and Figure 6 is a diagram of a field showing a pattern in which material is deposited.

Like parts are indicated by like characters throughout the specification and drawings.

1 is the seed pot of a corn planter. 2 is the tongue by which the planter may be attached to a tractor or other power. 3 is the press wheel. 4 is the wheel axle. 5 is the sprocket chain driving the seed plate mechanism. 6 is the planter frame member. 7 is the drive shaft of the seed plate mechanism driven by the sprocket chain 5 through the usual sprocket gears from the axle 4. 8 is the shaft of the seed release mechanism. All these elements are usual in corn planters and are not shown or described in detail.

9 is a frame extension, there being one at either end of the planter frame, they might be made integral with the frame. On one of the frame extensions 9 is a ground marking device 10. On the other extension is a mark detector 11. As will hereinafter appear, the marking device and mark detector may be interchanged in position at the end of each row or there may be a marking device and a mark detector on each frame extension and one or the other set may be thrown into or out of operation by means of a switch. As the planter goes back and forth across the field it is necessary to reverse the relative position of the marking device and mark detector with each 180 degrees change in direction of the planter.

12 is the seed release actuating solenoid. 13 is the planting boot. 14 is the marking device actuating solenoid. 15 is the counter. 16 is an audible signal as an added indication that the device is functioning properly. This is desirable as a substitute for the sound made by the contact with the check wire which is absent from my apparatus because no check wire is used. 17 is the control switch. 18 is the battery or other suitable source of power.

The mark detector housing 11 contains a radiation detector 19, which preferably takes the form of a photoelectric cell or other radiation responsive element responsive to the source 20 of light or other radiation. These are separated by an opaque partition 21. The housing 11 is partially closed at its bottom by the shield 22 apertured at 23 for the transmission of radiation, and at 24 for the receipt of radiation from a reflecting, fluorescent, or other suitable material 25 deposited on the ground, as will hereinafter appear. The shield 22 extends laterally around the housing 11 to protect the ground and the reflecting or fluorescent material from sunlight or other interference.

The marking device housing 10 is adapted to contain a suitable supply of marking material, perhaps lime, which will reflect light or electronic radiations as the case may be. This housing 10 also contains any suitable type of discharge valve actuated by the marking device actuating solenoid 14, so that each time the solenoid 14 is operated a quantity of reflecting or similar material will be deposited.

Whenever the marking detector or scanning unit 11 passes over a mark, radiation will be reflected from the source by the reflecting material to the detector 19. This will energize the circuit, causing energizing of the marking device solenoid 14 and the seed release solenoid 12, the counter 15 and the audible signal 16. Thus each time the planter travels over a mark on the ground seed will be planted, in the present illustration, in two rows and a mark will be deposited in a parallel row.

When the planter reaches the end of the row and turns around, the marking device and mark detector will be reversed, or if there are two sets one for each side of the planter, the relationship between the marker and detector will be reversed, and the planter goes back along the row. Each time it reaches one of the marks deposited from the preceding trip across the field a signal will be received, corn will be planted and another mark deposited. This process continues until the entire field is planted. Thus all that is necessary is for the operator to guide his planter along the field traveling along the line of markers and each marker will insure that corn is planted in the proper place at the proper time.

On the first trip other steps must be taken, of course, to set the initial pattern of marking spots. This may be done by manual manipulation of a switch or by a mechanical connection between the circuit and the press wheel or by previously depositing markers at measured points along the prospective travel of the planter or by manual operation of the marking device as the case may be.

The planter might plant one row or two rows or four rows, as the case may be. It might be used for planting corn or any other suitable seed, and the mechanism and arrangements I propose might equally well be used for any other purpose in the field where it is desired to plant or seed or impress periodically as the vehicle travels across the field.

The position of the mark detector or scanning unit on the frame of the planter might be widely varied from that shown in the drawing. For instance, if the mark detector is in the middle of the frame then the operator would drive down the row steering on the mark on the ground ahead of it.

A simple and easy way to accomplish the object indicated is set out above. However, this same purpose may be accomplished in a number of different manners. For instance, instead of depositing material which forms a reflecting surface reflecting light back to a photoelectric cell, we might deposit some fluorescent material. Under these circumstances the radiation source would have to be a source which would activate that fluorescent material and, in this case, the scanning element or the radiation responsive element would no longer be a photoelectric cell, but would be a suitable electronic organism which would respond to the fluorescence of the marker excited at the proper time. Or, instead of depositing a reflecting material or an excitable material, we might deposit a radioactive or previously magnetically energized material which then without special excitation as the apparatus passes by would nevertheless exert an influence on the scanning device to cause operation of the marker dropping and seed dropping mechanisms. Another modification might take the form of a substance inert, for instance, iron, nickel or the like, the presence of which could be electronically or magnetically detected, or some other substance or object might be dropped which could be energized or stimulated in such a manner that it would be detected by the detector portion of the scanning apparatus.

It is not important how the pattern is originally set. That might be by wheel rotation, camming action, manual control or anything else. The essential thing is that once the pattern has been set the mechanism follow it uniformly throughout the area of planting.

I claim:

1. In a seed planter including means for propelling it in a generally forward direction, a seed dropping device, a scanning device and a marker depositing device, electrically controlled means responsive to the scanning device for automatically causing simultaneous deposit of seed and a marker each time the scanning device passes over a previously deposited marker, the marker depositing device being located at one side of the line of travel of the seed depositing device whereby it may deposit its markers on a part of the ground undisturbed by the seed dropping device.

2. In a seed planter including means for propelling it in a generally forward direction, a seed dropping device, a scanning device and a marker depositing device, electrically controlled means responsive to the scanning device for automatically causing simultaneous deposit of seed and a marker each time the scanning device passes over a previously deposited marker, the marker depositing device being located at one side of the line of travel of the seed depositing device whereby it may deposit its markers on a part of the ground undisturbed by the seed dropping device, the marker depositing device being located on the side of the seed depositing device opposed to the location of the scanning device.

3. In a seed planter including means for propelling it in a generally forward direction, a seed dropping device, a scanning device and a marker depositing device, electrically controlled means responsive to the scanning device for automatically causing simultaneous deposit of seed and a marker each time the scanning device passes over a previously deposited marker, the marker depositing device being located at one side of the line of travel of the seed depositing device whereby it may deposit its markers on a part of the ground undisturbed by the seed dropping device, the scanning device, the marker depositing device and the seed depositing device being generally aligned along a line perpendicular to the line of travel of the seed planter.

GEORGE S. HAMILTON.

REFERENCES CITED

The following references are of record in the file of this patent:

UNITED STATES PATENTS

| Number | Name | Date |
|---|---|---|
| 528,761 | Collins | Nov. 6, 1894 |
| 948,260 | Stout | Feb. 1, 1910 |
| 1,186,795 | Johnson | June 13, 1916 |
| 1,206,705 | Hevel et al. | Nov. 28, 1916 |
| 1,226,515 | Hicks | May 15, 1917 |
| 1,252,923 | Moench | Jan. 8, 1918 |
| 1,592,250 | Yerkes | July 13, 1926 |
| 1,806,389 | Dickerson | May 19, 1931 |
| 1,998,271 | Clark | Apr. 16, 1935 |
| 2,177,803 | Ferte et al. | Oct. 31, 1939 |
| 2,199,421 | Stevens | May 7, 1940 |